United States Patent
Hayakawa et al.

(10) Patent No.: US 7,344,436 B2
(45) Date of Patent: Mar. 18, 2008

(54) APPARATUS FOR SEPARATING THIGH MEAT AND OYSTER MEAT

(75) Inventors: Hiroyuki Hayakawa, deceased, late of Koto-ku (JP); by Katsuhiro Hayakawa, legal representative, Koto-ku (JP); Koji Kido, Koto-ku (JP)

(73) Assignee: Mayekawa Mfg. Co., Ltd. (JP)

( * ) Notice: Subject to any disclaimer, the term of this patent is extended or adjusted under 35 U.S.C. 154(b) by 0 days.

(21) Appl. No.: 11/611,418

(22) Filed: Dec. 15, 2006

(65) Prior Publication Data

US 2007/0082596 A1    Apr. 12, 2007

Related U.S. Application Data

(62) Division of application No. 11/312,829, filed on Dec. 20, 2005, now Pat. No. 7,195,554.

(51) Int. Cl.
*A22C 17/00* (2006.01)
(52) U.S. Cl. ...................................................... 452/135
(58) Field of Classification Search ................ 452/135, 452/136, 149–153, 160, 170
See application file for complete search history.

(56) References Cited

U.S. PATENT DOCUMENTS 4,939,813 A    7/1990    Hazenbroek

FOREIGN PATENT DOCUMENTS

| JP | 61-043954 A | 3/1986 |
|----|-------------|--------|
| JP | 4-228022 A | 8/1992 |
| JP | 5-1844281 A | 7/1993 |
| JP | 10-4868 A | 1/1998 |
| JP | 2002-10732 A | 1/2002 |

OTHER PUBLICATIONS

Relevant portion of International Search Report of corresponding PCT Application PCT/JP03/07851.

*Primary Examiner*—Thomas Price
(74) *Attorney, Agent, or Firm*—Rossi, Kimms & McDowell, LLP

(57) ABSTRACT

A method and an apparatus for separating thigh meat and oyster meat from the thighbone can automatically separate thigh meat and oyster meat without detecting the boundary of the white cap at an end of the thighbone and the meat including thigh meat and oyster meat. The apparatus includes a cutter that is inserted into the detected boundary part in the final operation of deboning a thigh-with-bone of an edible beast and bird. The apparatus has a clamper, a guide-with-a-groove device, and a guide-with-a-cutter device downstream of the guide-with-a-groove device provided on the transfer line of the clamper. Both guide devices are provided such that the open end side of each guide device, which is Y-shaped is directed toward upstream of transfer of the clamper.

7 Claims, 8 Drawing Sheets

FIG. 7
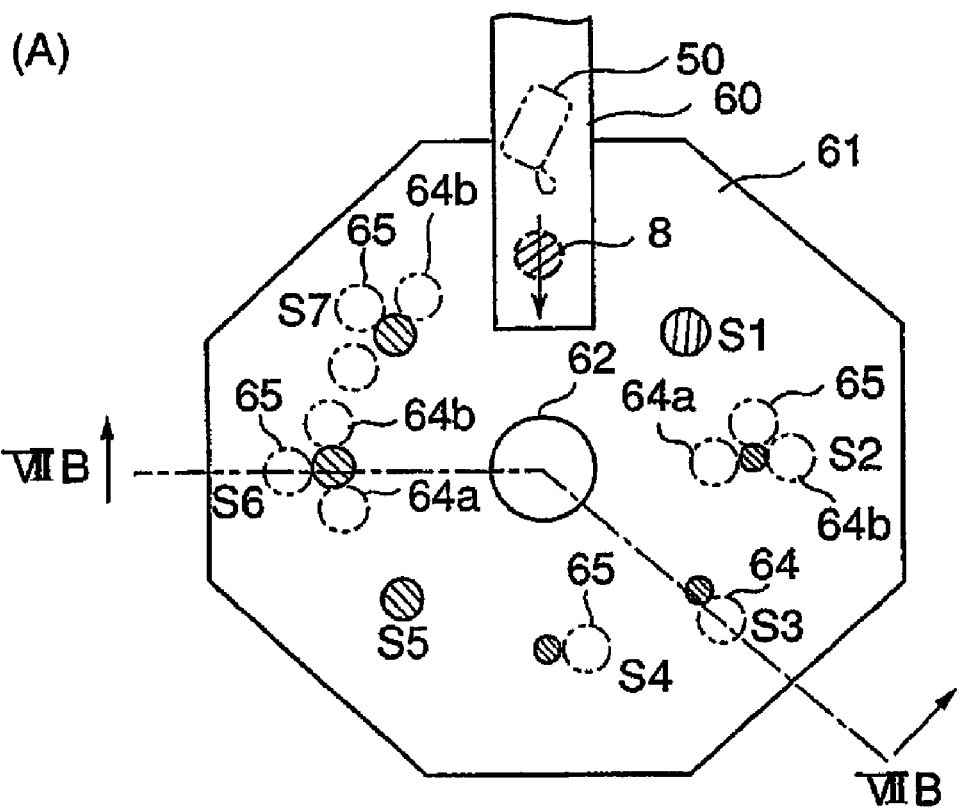
(A)
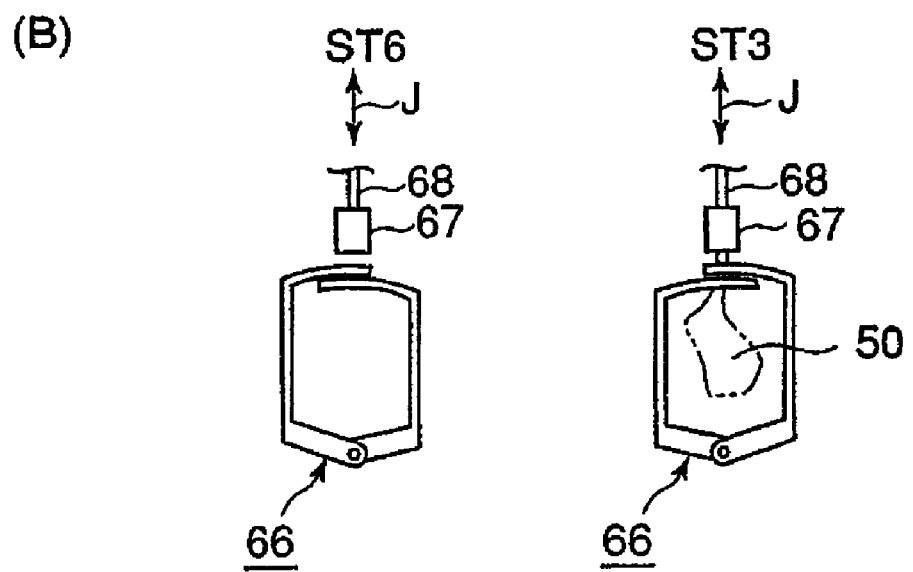
(B)

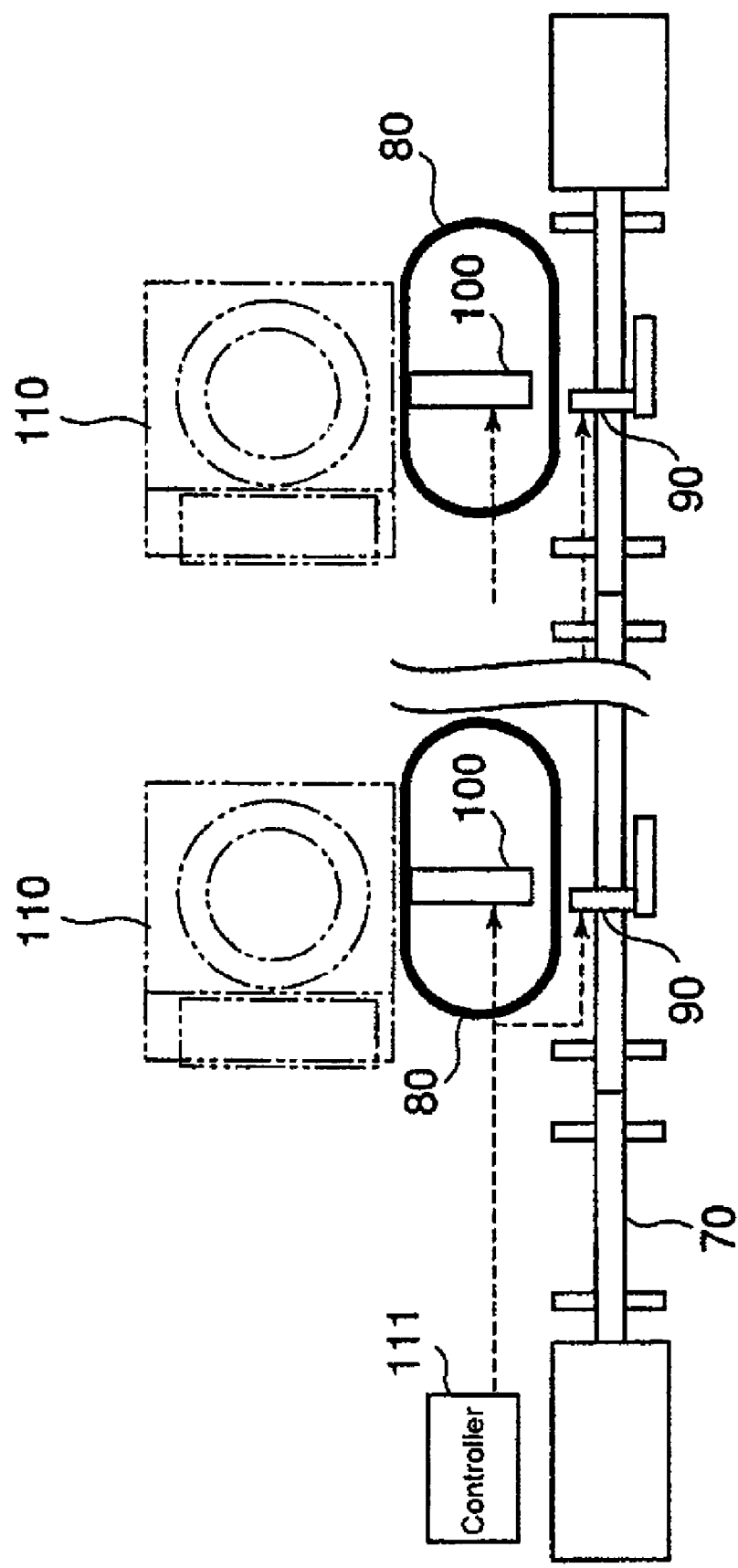

APPARATUS FOR SEPARATING THIGH MEAT AND OYSTER MEAT

This application is a divisional of application Ser. No. 11/312,829 filed Dec. 20, 2005, now U.S. Pat. No. 7,195,554.

TECHNICAL FIELD

The present invention relates to deboning a thigh of poultry such as a chicken, turkey, etc., specifically relates to the final step of separating thigh meat and oyster meat from the cartilage at an end of the thighbone (hereafter referred to as white cap) in the process of deboning the thigh, and more specifically to separating a small lump of meat (hereafter referred to as oyster meat) connecting with a sinew to the white cap from thigh meat adhering to the oyster meat with a membrane tissue.

BACKGROUND ART

Rough disassembling, breast deboning, thigh deboning processes of chickens, turkeys, etc. have been automatized as automatization in food factories advances in recent years. Especially in the process of deboning a thigh, the step of making incision and deboning has been automatized and thigh meat has been obtained almost without aid of man power by loading a thigh-with-bone to a deboning apparatus except that final step of separation of the thigh meat and oyster meat from the white cap is not yet automatized.

In conventional apparatuses for deboning a thigh, thigh meat is separated from bones together with the oyster meat adhering to the thigh meat, and separation of the oyster meat from the thigh meat is needed to be performed manually.

In the case of a turkey which is a large kind of poultry, a mature cock turkey weighs 18~20 Kg which is about 10 times of a mature chicken. Turkeys are highly popular in Europe and North America, and production is increasing year by year as health foods, for they are nutritious and low in fat.

By the way, deboning a thigh is carried out manually using a cutter on almost all of the processing lines of turkeys in Europe and the United States. In the case of a cock turkey, deboning a large and heavy turkey thigh, which is about 8 times the weight of a chicken thigh, can be dangerous, as well as demanding lots of time and labor.

In a conventional deboning operation of a chicken thigh, the bones are removed from a thigh-with-bone separated at the femoral joint with the foot part thereof cut away at the spur. About 720 thighs can be deboned on average in a day by a skilled worker. In this case, the worker comes in direct contact with the meat, and the sanitary supervision cost is relatively high. To solve such a problem, a method and a system for deboning edible beasts and birds were proposed in Japanese Laid-Open Patent Application No. 5-184281 (hereafter referred to as patent literature 1).

According to the proposal, as shown in FIG. 6, an incision around the ankle 51 is made, and a longitudinal incision is made to the thigh meat of a work 50 (thigh) at about the same time. Then the shinbone 56 is inserted into the hole of a device (the hole being able to be enlarged elastically) to be drawn through the hole so that the meat is scraped off from the bones in the order of zones E,F and G. During the scraping operation, the sinew 57 is cut with a cutter at the first cutting step 52 and second cutting step 53 to enable the scraping in the F zone. Near the end of deboning 54, a small lump of oyster meat 58 is still connected to the thighbone 55 with the sinew 58a at the white cap 55a at an end of the thighbone with the thigh meat 59 adhering to the oyster meat 58 by the intermediary of a membrane tissue.

FIG. 7(A) is a schematic plan view of the above mentioned deboning apparatus, and FIG. 7(B) is a fragmentary view taken in the direction of the arrows along line VIIB-VIIB of FIG. 7(A). As shown in FIG. 7(A), an octagonal rotary table 61 is provided which can rotate around the main shaft 62 intermittently by 45°. Deboning is carried out at stations S1~S8, each stations being provided to correspond to eight sides of the table 61. In the drawing, station 8 is depicted with a dotted line because it is positioned under a conveyor 60 described later.

The shinbone of the work 50, which is a thigh to be deboned and transferred on a transfer conveyor 60 to the station 1, is attached to a chuck 67 by human hands, then the thigh meat scraping operation is carried out which consists of drawing the thigh through the device having a flexible hole, making the first and second incisions as shown in FIG. 6 with a pair of cutters 64a, 64b and a single cutter 65 provided at each station so that the thigh meat can be scraped off from the bones in the zones E, F, G sequentially while intermittently rotating the table to feed the work 50 to each station.

The chuck 67 is attached to a lifting rod 68 which can be vertically moved up and down as shown in FIG. 7(B) by an arrow J so that the work 50 attached to the chuck is lifted at stations ST3 and ST6 to scrape off the thigh meat from the bones by means of a meat separator 66.

In FIG. 5 is shown the process of deboning at each station, in which scraping of meat and cutting of sinew are done as follows:

ST1: attaching of thigh,
ST2: making an incision around the ankle,
ST3: scraping of meat from the shinbone and cutting of the sinew of small bones,
ST4: scraping of meat from the shinbone and cutting of the sinew at a joint,
ST5: measuring of position of the joint,
ST6: scraping of meat from a joint part and cutting of the sinew at a joint,
ST7: scraping of meat from a joint part and cutting of the sinew at the thighbone, and
ST8: scraping of meat from the thighbone.

When deboning is completed at ST8, the oyster meat 58 is still adhering to the white cap 55a at an end of the thighbone 55 and the thigh meat 59 is adhering to the oyster meat by the intermediary of a membrane tissue as shown in FIG. 6. Therefore, it is required to automatize the final separation operation to separate the thigh meat and oyster meat from the white cap 55a.

On the other hand, there is no suitable autoloader available for loading a thigh of an edible beast or bird to said deboning system, and complete automatization had not been realized.

To solve the problem, an auto-loading system was proposed in Japanese Laid-Open Patent Application No. 10-4868, in which a plurality of deboning apparatuses are located along a transfer conveyor for transferring thighs, a plurality of buffer conveyors for allowing temporary retention of works (thighs to be deboned) thereon are provided between the transfer conveyor and the deboning apparatuses respectively so that the work can be fed to the deboning apparatus located downstream without delay and the work transferred by the transfer conveyor can be shifted efficiently from the transfer conveyor to the deboning apparatus and from the same to the transfer conveyor without stopping the transfer of other works by the transfer conveyor.

The construction of the system is, as shown in FIG. 8, composed of a transfer conveyor 70, a plurality of buffer conveyors 80, a plurality of shifting devices 90, a plurality of loading devices 100, a plurality of deboning apparatuses 110, and a controller 111 for controlling the actuation of the shifting devices 90 and loading devices 110. Each of the shifting devices 90 is located to correspond to each of the buffer conveyors 80 and loading devices 100.

The prior art disclosed in patent literature 1 is to automatize deboning operation of a thigh of an edible beast or bird. By the art, the deboning can be performed stably without the need for specialists. Particularly in the case of deboning the thigh of a turkey, by applying the present invention to the turkey processing line in which deboning of the thigh has been carried out manually by skilled workers using cutters, safe deboning operation without a lot of labor becomes possible, however, complete deboning to obtain thigh meat with oyster meat removed can not be realized.

DISCLOSURE OF THE INVENTION

The present invention was made in light of the problems mentioned above, and the object is to provide a method and apparatus to separate thigh meat and oyster meat from the white cap at an end of the thighbone automatically without detecting the boundary of the white cap at an end of the thigh bone and the meat including thigh meat and oyster meat and inserting a cutter into the detected boundary part in the final operation of deboning a thigh.

The present invention proposes a method of separating thigh meat and oyster meat from an end of the thighbone when performing separation of the thigh meat adhering to a small lump of meat connecting to the thigh meat with a membrane (hereafter referred to as oyster meat) and the oyster meat connecting to a cartilage at an end of the thighbone (hereafter referred to as white cap) from the white cap of a work which is a thigh-with-bone of an edible beast or bird with the meat part scraped off down to the white cap, wherein the root part of the thighbone just below the knee joint is clamped so that the thighbone can be swung to be tilted forward while transferred; a Y-shaped guide-with-a-cutter, which has a narrow slot extending along the work transfer direction at a base part thereof and a cutter fronting the downstream side opening of the narrow slot, is provided such that the open end side of the Y-shape is directed toward upstream of transfer of the work; whereby the thighbone contacts the Y-shaped guide and tilts forward, the white cap at an end of the thighbone rides on the guide while the sinew connecting the oyster meat to the white cap is introduced into the narrow slot as the work is transferred with the oyster meat and thigh meat hanging from the white cap under the guide, and the sinew is cut with the cutter fronting the downstream side opening of the narrow slot to separate the oyster meat and the thigh meat from the white cap to allow them to fall down.

The above invention relates to the final separating operation for the work which is a thigh-with-bone of an edible beast or bird with the meat part scraped off down to the white cap in a deboning operation of an edible beast or bird such as a chicken, turkey, etc. and of which the thigh meat is adhering to the oyster meat with a membrane and in turn the oyster meat is connecting to the white cap with a sinew. According to the invention, it is unnecessary to detect the position of the end of the white cap by a sensor in order to decide the position for cutting the sinew connecting the oyster meat to the white cap, which is not necessarily an easy operation, for the thigh meat and oyster meat can be separated automatically as the work is transferred in a state the root part of the thighbone of the work is clamped to a clamper capable of swinging with the oyster meat and thigh meat being in a free state.

That is, as mentioned above, the work is clamped at the root part of the thighbone just bellow the knee joint with a clamp so that the thighbone can be swung in a vertical plane parallel to the transfer direction and the white cap at an end of the thighbone can be moved up and down freely with the oyster meat and thigh meat hanging from the white cap and transferred in this state. A Y-shaped guide-with-a cutter having a narrow slot extending along the work transfer direction at a base part thereof and a round blade cutter fronting the downstream side opening of the narrow slot is provided on the transfer line, the work is introduced from the open end side of the Y-shaped guide toward the narrow slot, the sinew connecting the oyster meat to the white cap is allowed to pass the narrow slit, and the sinew is cut with the round blade cutter at the exit of the narrow slot, thus the thigh meat with the oyster meat adhered thereto is separated from the white cap automatically.

It is preferable in the method of separating thigh meat and oyster meat of the invention that said Y-shaped guide is composed to be a Y-shaped guide-with-a-groove, which has a narrow throat at a base part thereof and an open groove (vertical through-hole) following the narrow throat, whereby the oyster meat passes through the open groove (vertical through-hole) to be scraped off from the thigh meat having a width not capable of passing through the groove (vertical through-hole) and rides on the guide together with the white cap at an end of the thighbone as the work is transferred, thus the thigh meat is separated from the oyster meat and falls down.

There is a case it is desirable that the oyster meat is separated from the thigh meat. According to the above invention, the thigh meat adhering to the oyster meat with a membrane can be separated from the oyster meat. The Y-shaped guide is configured to have a narrow throat at a base part thereof and an open groove (vertical through-hole) following the narrow throat. The oyster meat allowed to pass upward through the open groove (vertical through-hole) whereas the thigh meat can not pass through the open groove and resides under the guide, thus the thigh meat is separated from the oyster meat.

It is preferable in the method of separating thigh meat and oyster meat of the invention that the root part of the thighbone just bellow the knee joint is clamped with a clamper so that the thighbone can be swung to be tilted forward while transferred; a Y-shaped guide-with-a-cutter, which has a narrow slot extending along the work transfer direction at a base part thereof and a cutter fronting the downstream side opening of the narrow slot, is provided such that the open end side of the Y-shape is directed toward upstream of transfer of a work without the thigh meat which has been removed; the thighbone contacts the Y-shaped guide and tilts forward, the white cap at an end of the thighbone rides on the guide while the sinew connecting the oyster meat to the white cap is introduced into the narrow slot as the work is transferred with the oyster meat hanging from the white cap, and the sinew is cut with the cutter fronting the downstream side opening of the narrow slot to separate the oyster meat from the white cap.

The above invention relates to the method of separating the oyster meat from the white cap when the thigh meat is already separated from the oyster meat and only the oyster meat is connecting to the white cap. A work with the thigh meat removed and only the oyster meat remaining is transferred downstream to be introduced in a Y-shaped guide-with-a-cutter having a narrow slot extending along the work transfer direction at a base part thereof and a round blade cutter fronting the downstream side opening of the narrow slot and provided on the transfer line, the sinew connecting the oyster meat to the white cap is allowed to enter the narrow slot, and the sinew is cut with the round blade cutter at the exit of the narrow slot.

It is preferable in the method of separating thigh meat and oyster meat that a Y-shaped guide-with-a-groove, which has a narrow throat at a base part thereof and an open groove (vertical through-hole) following the narrow throat, is provided in the upstream of said Y-shaped guide-with-a-cutter such that the open end side of the Y-shape is directed toward upstream of transfer of the work; the oyster meat connecting to the white cap with a sinew is allowed to pass through the groove (vertical through-hole) of the Y-shaped guide-with-a-groove located upstream whereas the thigh meat which can not pass through the groove (vertical through-hole) is allowed to remain under the groove (vertical through-hole) to be separated from the oyster meat as the work is transferred; then the sinew connecting the oyster meat to the white cap is cut with the cutter of the Y-shaped guide-with-a-cutter in the downstream to separate the oyster meat from the white cap.

The above invention relates to the method of separating the thigh meat and oyster meat separately in the final operation of separating the oyster meat and the thigh meat adhering to the oyster meat with a membrane. In the upstream of said Y-shaped guide-with-a-cutter is provided on the transfer line a Y-shaped guide-with-a-groove having a narrow throat at a base part thereof and an open groove (vertical through-hole) following the narrow throat such that the open end side of the Y-shape is directed toward upstream of transfer of the work. So, as the work transfers, the oyster meat connecting to the white cap passes through the narrow slot to ride on the guide, but the thigh meat can not pass through the narrow slot, and the thigh meat adhering to the oyster meat is separated from the oyster meat as described above. Then, the sinew connecting the oyster meat to the white cap proceeds in the narrow slot of the Y-shaped guide-with-a-cutter, whereby the sinew is cut with the round blade cutter at the exit of the narrow slot, thus the thigh meat and oyster meat are separated from the thighbone separately.

The apparatus suited for applying the method of separating the thigh meat and oyster meat of the invention is an apparatus for finally separating thigh meat adhering to a small lump of meat connecting to the thigh meat with a membrane (hereafter referred to as oyster meat) and the oyster meat connecting to the cartilage at an end of the thighbone (hereafter referred to as white cap) from the white cap of a work which is a thigh-with-bone of an edible beast or bird with the meat part scraped off down to the white cap, wherein are provided a clamper for clamping a work at the root part of the thighbone just bellow the knee joint so that the thighbone can be swung to be tilted forward while transferred, and a Y-shaped guide-with-a-cutter, which has a narrow slot extending along the work transfer direction at a base part thereof and a cutter fronting the downstream side opening of the narrow slot, provided such that the open end side of the Y-shape is directed toward upstream of transfer of the work; whereby the thighbone of the work comes in contact with the guide, the thighbone tilts forward, the white cap at an end of the thighbone rides on the guide while the sinew connecting the oyster meat to the white cap is introduced into the narrow slot as the work is transferred with the oyster meat and thigh meat hanging from the white cap under the guide, and the sinew is cut with the cutter fronting the downstream side opening of the narrow slot to separate the oyster meat and thigh meat from the white cap.

The above invention relates to a suitable apparatus for separating thigh meat and oyster meat using the method of the invention for separating the thigh meat and oyster meat. The apparatus consists of a clamper which transfers clamping the root part of the thighbone just bellow the knee joint of the work so that the thighbone can be swung with the white cap at an end of the thigh bone being a free end; and a Y-shaped guide-with-a-cutter, which has a narrow slot extending along the work transfer direction at a base part thereof and a cutter fronting the downstream side opening of the narrow slot, disposed such that the open end side of the Y-shape is directed toward upstream of transfer of the work. The work is introduced in the Y-shaped guide-with-a-cutter from the open end side, the thighbone of the work contacts the guide, the sinew connecting the oyster meat to the white cap enters the narrow slot whereas the white cap rides on the base part of the guide, and the sinew connecting the oyster meat to the white cap enters the narrow slot as the work transfers. The sinew is cut with the round blade cutter at the exit of the narrow slot, thus the oyster meat and the thigh meat adhering thereto are separated from the thighbone.

The apparatus described above can be used suitably in the case of a small edible beast or bird such a chicken, etc.

It is preferable in the apparatus for separating thigh meat and oyster meat of the invention that said Y-shaped guide is composed to be a Y-shaped guide-with-a-groove, which has a narrow throat at a base part thereof and an open groove (vertical through-hole) following the narrow throat, whereby the oyster meat capable of passing through the open groove (vertical through-hole) is separated from the thigh meat which can not pass through the open groove and rides on the guide together with the white cap at an end of the thighbone as the work is transferred, thus the thigh meat is separated from the oyster meat.

In the case of a large edible beast or bird such as a turkey, etc., it is desirable that the oyster meat is separated from the thigh meat, and the above invention was made to meet the case like this.

In the invention, a Y-shaped guide-with-a-groove, which has a narrow throat at a base part thereof and an open groove (vertical through-hole) following the narrow throat, is provided with the open end side of Y-shape directed toward upstream of transfer the work instead of said Y-shaped guide-with-a-cutter. The oyster meat of a large edible beast or bird is pulled up through the open groove (vertical through-hole) leaving the thigh meat under the open groove, thus the thigh meat is scraped off from the oyster meat to be separated therefrom.

It is preferable in the apparatus for separating oyster meat with thigh meat being separated therefrom from the white cap in the apparatus of the invention for separating thigh meat and oyster meat that there are provided a clamper for clamping a work consisting of thighbone and oyster meat connecting to the white cap at an end of the thighbone at the root part of the thighbone just below the knee joint so that the thighbone can be swung to be tilted forward while transferred, and a Y-shaped guide-with-a-cutter, which has a narrow slot extending along the work transfer direction at a base part thereof and a cutter fronting the downstream side opening of the narrow slot, provided such that the open end side of the Y-shape is directed toward upstream of transfer of the work; whereby the thighbone of the work comes in contact with the guide, the thighbone tilts forward, the white cap at an end of the thighbone rides on the guide while the sinew connecting the oyster meat to the white cap is introduced into the narrow slot as the work is transferred with the oyster meat hanging from the white cap under the guide, and the sinew is cut with the cutter fronting the downstream side opening of the narrow slot to separate the oyster meat from the white cap.

The above invention relates to an apparatus for separating the oyster meat from the white cap when the thigh meat is already separated from the oyster meat and only the oyster meat is connecting to the white cap. In the invention, a Y-shaped guide-with-a-cutter, which has a narrow slot extending along the work transfer direction at a base part thereof and a cutter fronting the downstream side opening of the narrow slot, is provided such that the open end side of the Y-shape is directed toward upstream of transfer of the work, the sinew connecting the oyster meat to the white cap allowed to proceed in the narrow slot and cut with the round blade cutter at the exit of the narrow slot to separate the oyster meat from the from the white cap. The width of the narrow slot is smaller than that of the oyster meat and the oyster meat does not be pulled up through the narrow slot.

It is preferable in the apparatus of the invention for separating thigh meat and oyster meat that a Y-shaped guide-with-a-groove, which has a narrow throat at a base part thereof and an open groove (vertical through-hole) following the narrow throat, is provided in the upstream of said Y-shaped guide-with-a-cutter such that the open end side of the Y-shape is directed toward upstream of transfer of the work; whereby the white cap at an end of the thighbone and the oyster meat connecting to the white cap with a sinew is allowed to ride on the Y-shaped guide-with-a-groove located in the downstream passing through the open groove of the guide leaving the thigh meat which can not passes through the open groove under the guide thus separating the thigh meat from the oyster meat as the work is transferred, then the sinew connecting the oyster meat to the white cap is cut with the cutter of the Y-shaped guide-with-a-cutter provided downstream when the sinew proceeds in the narrow slot of the Y-shaped guide to separate the oyster meat from the white cap.

The above invention relates to an apparatus for separating the oyster meat connecting to the white cap with a sinew and the thigh meat adhering to the oyster meat separately. In the transfer line is located a Y-shaped guide-with-a-groove having a narrow throat at a base part thereof and an open groove (vertical through-hole) following the narrow throat in the upstream of a Y-shaped guide-with-a-cutter. With this configuration, the thigh meat is separated from the oyster meat when the work passes through by the Y-shaped guide-with-a-groove in a manner that the oyster meat is allowed to pulled up passing through the open groove (vertical through-hole) whereas the thigh meat can not pass through the open groove and is left under the open groove and separated from the oyster meat, then when the work with the thigh meat removed passes through the Y-shaped guide-with-a-cutter located in the downstream, the sinew connecting the oyster meat to the white cap is allowed to proceed in the narrow slot of the guide-with-a cutter and cut with the round blade cutter at the exit of the narrow slot to separate the oyster meat from the white cap.

It is preferable that a stopper guide is provided on the slot part of the Y-shaped guide-with-a-cutter for preventing the sinew connecting the oyster meat to the white cap from passing all through the narrow slot without being cut with the cutter of the guide.

BRIEF DESCRIPTION OF THE DRAWINGS

FIG. 7 is an illustration showing an embodiment of the apparatus for deboning a thigh of prior art, in which (A) is a plane view and (B) is a side view at the ST3 and ST6.

FIG. 8 is a plan view showing schematically the configuration of the auto-loading system of prior art.

BEST MODE FOR EMBODIMENT OF THE INVENTION

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
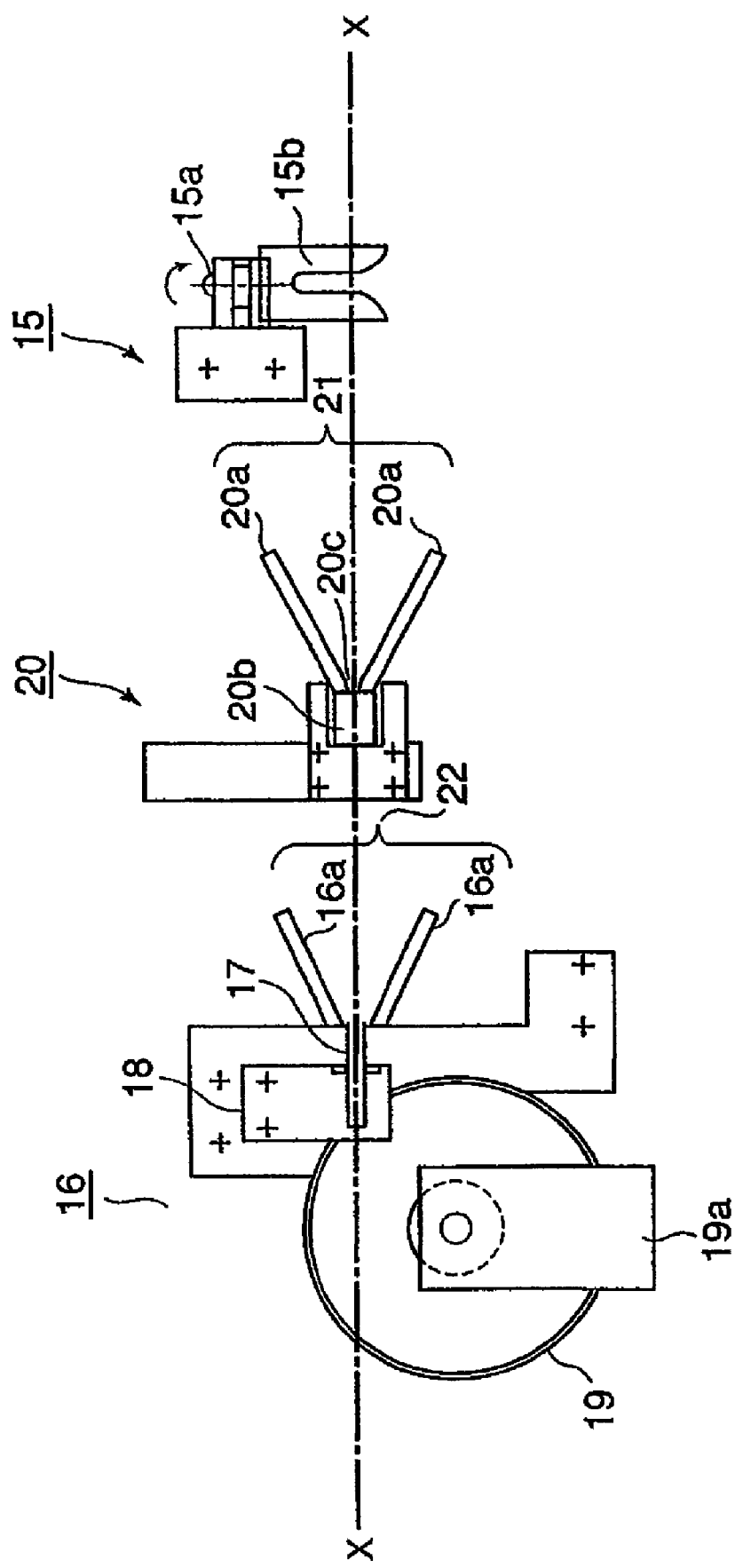
FIG. 1 is a top plan view schematically showing the configuration of the apparatus of the present invention for separating oyster meat and thigh meat.
Figure 2:
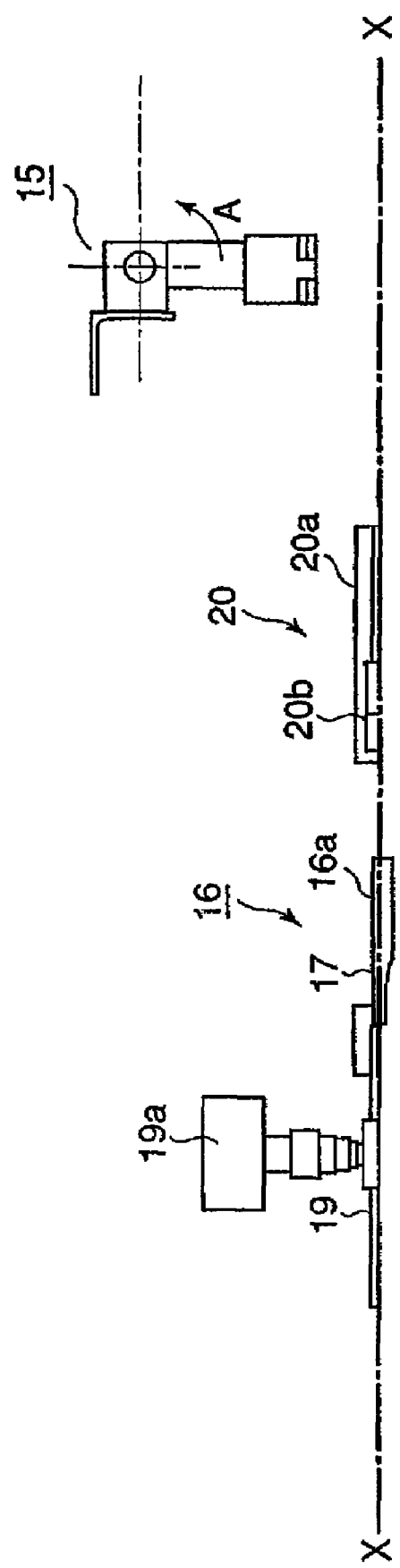
FIG. 2 is an elevational view of the apparatus of FIG. 1.
Figure 3:
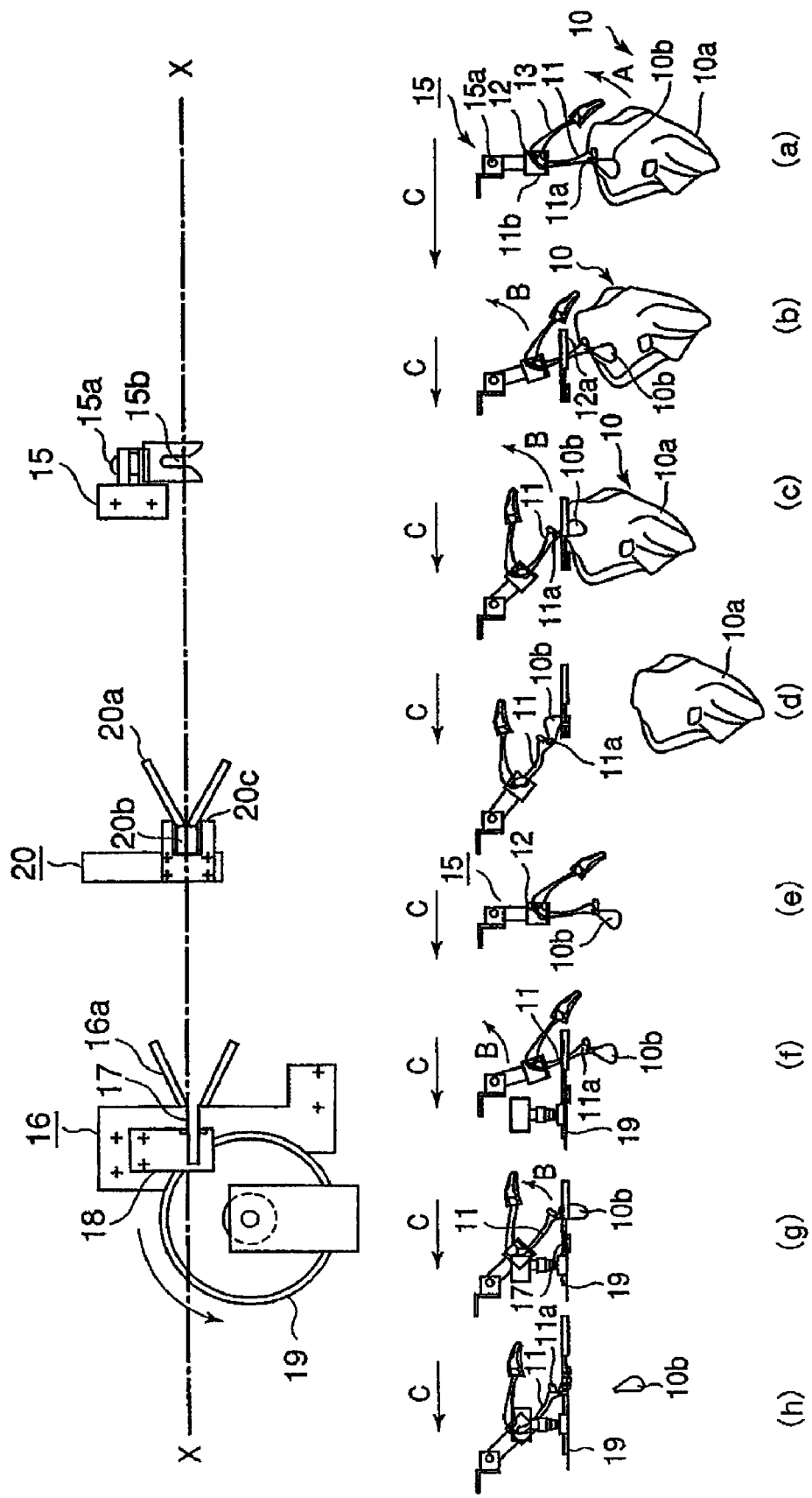
FIG. 3 is an illustration showing how thigh meat is separated from the white cap and then oyster meat is separated from the thigh meat by the apparatus of FIG. 1.

FIG. 1 is a top plan view schematically showing the configuration of the apparatus of the present invention for separating oyster meat and thigh meat, FIG. 2 is an elevational view of the apparatus of FIG. 1. FIG. 3 is an illustration showing how the thigh meat is separated from the white cap and then the oyster meat is separated from the thigh meat through the system of FIG. 1.

Figure 4:
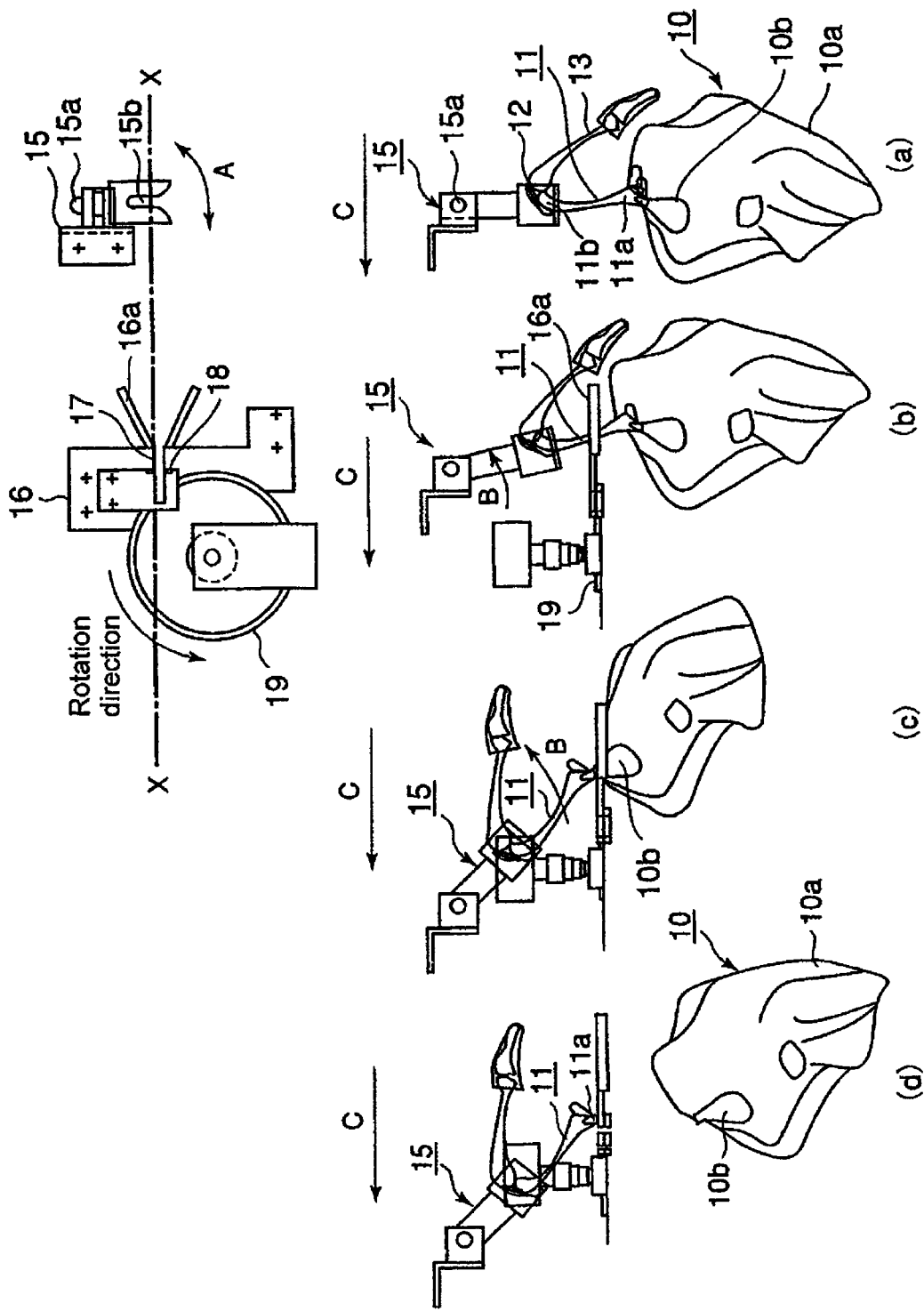
FIG. 4 is an illustration showing how thigh meat with oyster meat adhered thereto is separated from the white cap by the Y-shaped guide-with-a-cutter of the apparatus of FIG. 1.
Figure 5:
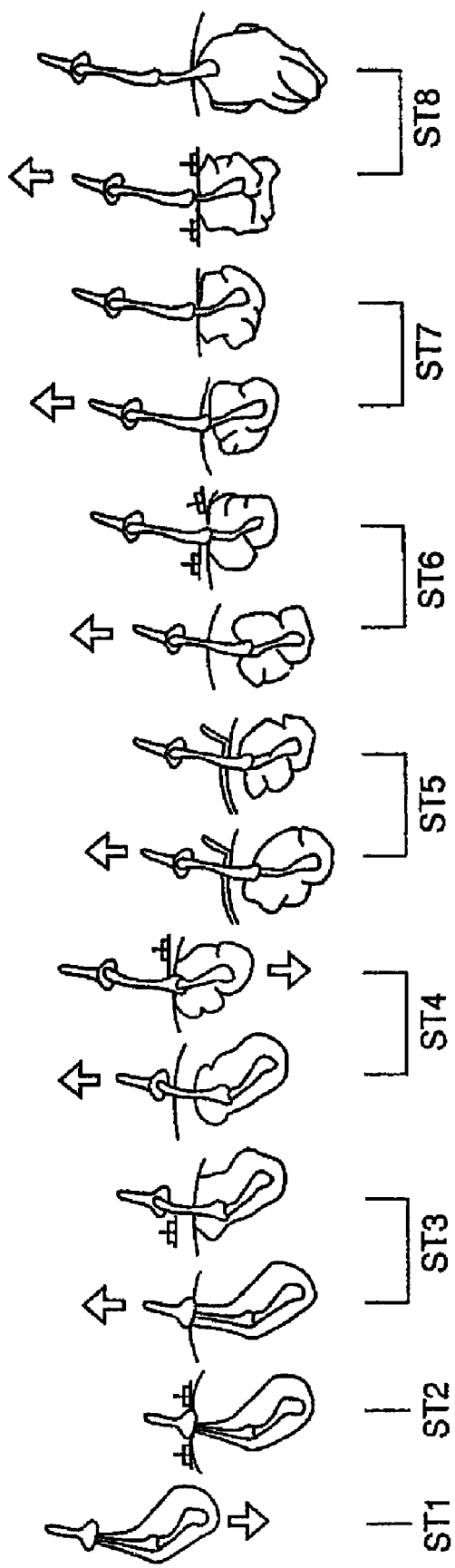
FIG. 5 is an illustration showing the sequence of carrying out deboning of a thigh of prior art.

FIG. 4 is an illustration showing how the thigh meat with oyster meat adhered thereto is separated from the white cap by the Y-shaped guide-with-a-cutter of the system of FIG. 1.

Referring to FIG. 1 and FIG. 2 showing the configuration of the apparatus of the invention for separating oyster meat and thigh meat, the apparatus comprises a clamper 15, a Y-shaped guide-with-a-groove 20, and a Y-shaped guide-with-a-cutter 16 provided thereto, the guides 20, 16 being located along the transfer line of the clamper such that each of the open side of the general shape of a letter 'Y' laid sideways is directed toward upstream of the transfer direction. As can be seen in FIG. 3, 4, the apparatus of the present invention relates to the final process of separating thigh meat and oyster meat from the white cap of the thighbone of a work which includes the meat part including thigh meat and oyster meat scraped off along the thighbone down to the white cap.

Figure 6:
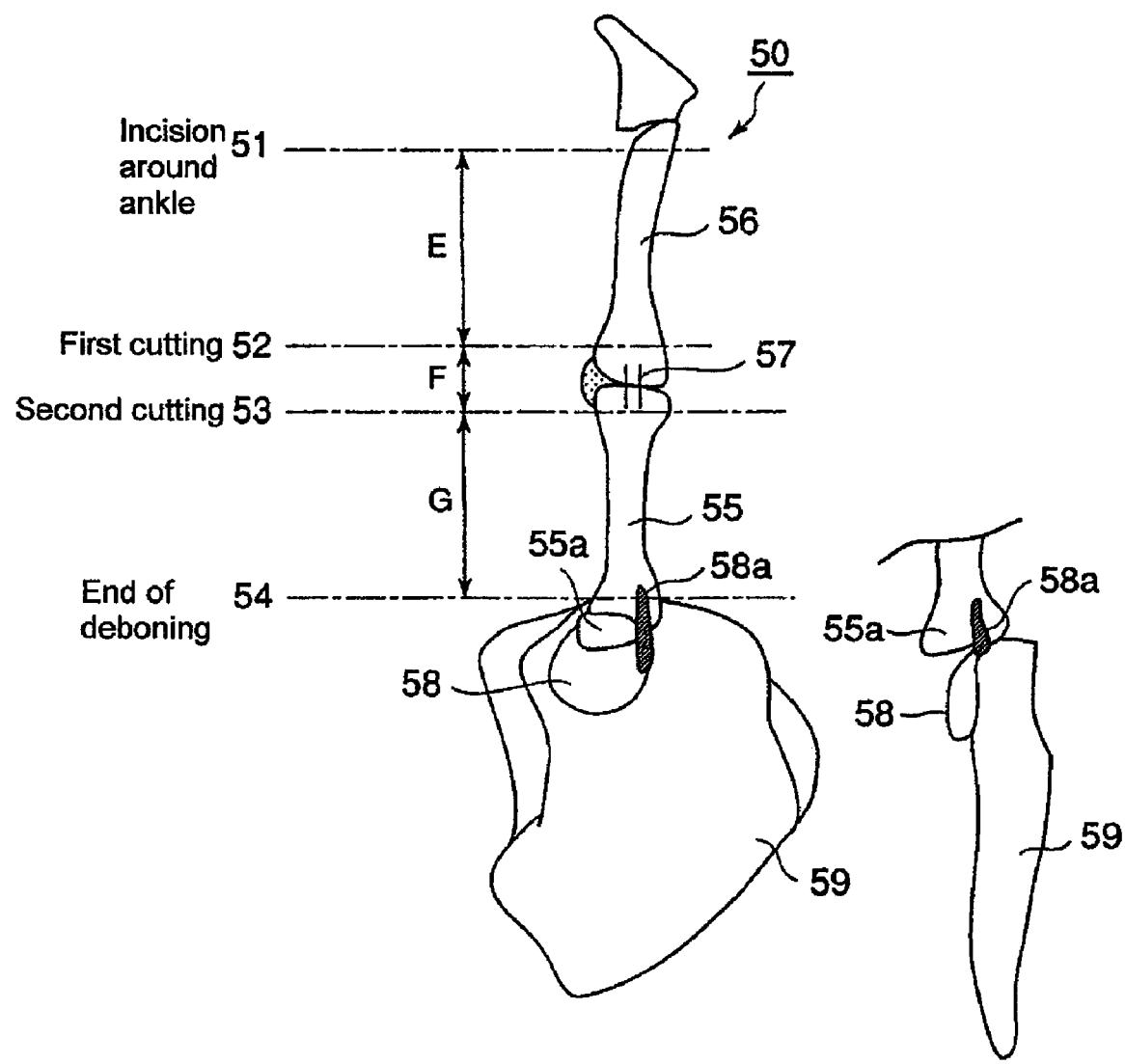
FIG. 6 is an illustration showing an embodiment of the method of deboning a thigh of prior art.

The clamper 15 includes a hanger 15b with a hook part having the general shape of a letter 'U' and supported possible to be swung around a support shaft 15a in the direction A (see FIG. 2). A thigh with its meat part scraped off along the shinbone and thighbone down to an end part of the thighbone as shown in FIG. 6 is hooked to the hanger 15b at the knee joint such that the shinbone is positioned upstream of the transfer direction of the work. As the work is swingably held it can accommodate works having different sizes.

As the work is held possible to be swung, influence of individual difference of works in size can be cancelled.

The Y-shaped guide-with-a-groove 20 comprises a Y-shaped guide 21 having a narrow throat 20c formed at a base part from which round bar guide members 20a, 20a extend along the transfer line x-x of the clamper such that the gap between both members widens toward upstream of the transfer direction of the work and an open groove (vertical through-hole) 20b following the narrow throat 20c.

The Y-shaped guide-with-a-cutter 16 comprises a Y-shaped guide 22 having a narrow slot 17 formed at a base part from which round bar guide members 20a, 20a extend along the transfer line x-x of the clamper such that the gap between both members widens toward upstream of the transfer direction of the work, a round blade cutter 19 which is driven by a driving device 19a provided in the downstream of the narrow slot 17 and of which the blade fronts the downstream side opening of the narrow slot 17, and a stopper guide 18 provided on the downstream part of the narrow slot 17.

In FIG. 3 is shown how thigh meat is separated from the white cap and then oyster meat is separated from the thigh meat by the apparatus of FIG. 1.

In the drawing, at step (a), a work 10 including the oyster meat 10b connecting to the white cap 11a at an end of the thighbone 11 with a sinew and the thigh meat 10a adhering to the oyster meat 10b with a membrane, is clamped at the knee joint 12 with the clamper 15 capable of swinging in the direction of arrow A with the shinbone 13 being in the upstream side and transferred in the direction of arrow C in a state the thighbone 11 can be swung in the direction of arrow B.

Then, at step (b), the work 10 is transferred to be introduced in the open end side of the Y-shaped guide-with-a-groove 20, at step (c) the white cap 11a of the work 10 contacts the inner sides of the round bar guide members 20a of which the gap between both members widens toward upstream of the transfer direction of the work, and the thighbone 11 tilts forward in the direction of arrow B as the work is transferred and the white cap 11a rides on the base part of the guide. As the work is further transferred, the sinew connecting the oyster meat 10b to the white cap 11a passes through the narrow throat 20c to enter the open groove (vertical through-hole) 20b, whereby the meat part is pulled upward as the work is transferred, but the thigh meat 10a can not pass through the open groove 20b, for the width of the open groove 20b is larger than that of the thigh meat 10a, and only the oyster meat 10b of which the width is smaller than that of the open groove 20b passes upward through the open groove 20b, thus the thigh meat 10a adhering to the oyster meat 10b with a membrane is scraped off from the oyster meat 10b and falls down as shown in step (d).

Then, the work with the thigh meat separated and the oyster meat being still remaining is transferred from step (e) to (f) in the direction of arrow C to enter the Y-shaped guide-with-a-cutter 16. The thighbone 11 tilts forward as shown by arrow B as it proceeds and the white cap 11a rides on the base part of the guide. Then the sinew connecting the oyster meat 10b to the white cap 11a proceeds in the narrow slot 17 as shown at step (g), the sinew is cut with the round blade cutter 19 fronting the downstream side opening of the narrow slot 17 and rotated in the direction of an arrow, and oyster meat 10b falls down as shown at step (h).

It may happen that the sinew is not cut perfectly and passes all through the narrow slot 17. The stopper guide 18 is provided to prevent this. The stopper guide 18 has a slot corresponding to the narrow slot 17 of which the downstream side is closed.

Thus, separation of thigh meat and oyster meat can be performed separately and automatically by use of the Y-shaped guide-with-a-groove 20 and Y-shaped guide-with-a-cutter 16 only by transferring the work 10 clamped with the clamper 15 capable of swinging.

FIG. 4 shows how thigh meat with oyster meat adhered thereto is separated from the white cap by the Y-shaped guide-with-a cutter 16 of the apparatus of FIG. 1. At step (a) in FIG. 4, a work 10 including the oyster meat 10b connecting to the white cap 11a at an end of the thighbone 11 with a sinew and the thigh meat 10a adhering to the oyster meat 10b with a membrane, is clamped at the knee joint 12 with the clamper 15 capable of swinging in the direction of arrow A with the shinbone 13 being in the upstream side.

Then, the work 10 is transferred in the direction of arrow C to be introduced in the open end side of the Y-shaped guide-with-a-cutter 16 at step (b). The white cap 11a of the work 10 contacts the inner sides of the round bar guide members 16a of which the gap between both members widens toward the upstream of the transfer direction of the work, and the thighbone 11 tilts forward in the direction of arrow B as the work is transferred and the white cap 11a rides on the base part of the guide. When the work is transferred further, the sinew connecting the oyster meat 10b to the white cap 11a proceeds in the narrow slot 17, that is, the sinew proceeds in the narrow slot in a state the oyster meat 10b and the thigh meat 10a adhering thereto are hanging from the white cap 11a which travels on the narrow slot 17 as shown at step (c). At step (d), the sinew connecting the oyster meat 10b to the white cap 11a is cut with the round blade cutter 19 provided to front the downstream side opening of the narrow slot 17 and the oyster meat and the thigh meat adhering thereto fall down.

With the construction of the present invention as described above, thigh meat and oyster meat can be separated from the thighbone separately or thigh meat with oyster meat adhering thereto can be separated automatically and efficiently without detecting the boundary of the white cap at an end of the thighbone and the meat including thigh meat and oyster meat and inserting a cutter into the detected boundary part in the final operation of deboning a thigh of an edible beast and bird.

The invention claimed is:

1. An apparatus for separating thigh meat from oyster meat, which is a small lump of meat connected to the thigh meat with a membrane and to a white cap with a sinew, the white cap being an end of a thighbone of a work, which is a thigh portion of an edible beast or fowl, the apparatus comprising:
   a clamper for clamping the work to allow the thighbone to be swung during conveyance thereof; and
   a guide-with-a-cutter device, which has a Y-shaped guide, a narrow slot extending along a conveying direction at a base part thereof, downstream relative to the conveying direction from the Y-shaped guide, and a cutter,
   wherein an open end side of the Y-shaped guide is directed toward upstream of the conveying direction, and
   wherein the Y-shaped guide contacts the thighbone and swings the thighbone toward upstream of the conveying direction, the white cap rides on the base part of the guide-with-a-cutter device while the sinew connecting the oyster meat to the white cap is introduced into the narrow slot as the thighbone with the attached oyster meat hanging from the white cap under the Y-shaped guide is conveyed, and the sinew is cut with the cutter to separate the oyster meat from the white cap.

2. The apparatus according to claim 1, further including a guide-with-a-groove device, which has Y-shaped guide with a narrow throat at a base part thereof, and an open slot following the narrow throat of the Y-shaped guide, wherein the open slot is dimensioned to allow the oyster meat to pass therethrough while preventing the thigh meat from passing therethrough as the work is being conveyed, thus separating the thigh meat from the oyster meat.

3. The apparatus according to claim 2, further including a stopper guide provided on the narrow slot of the guide-with-a-cutter device for preventing the sinew connecting the oyster meat to the white cap from passing through the narrow slot without being cut with the cutter.

4. The apparatus according to claim 1, further including a stopper guide provided on the narrow slot of the guide-with-a-cutter device for preventing the sinew connecting the oyster meat to the white cap from passing through the narrow slot without being cut with the cutter.

5. An apparatus for separating thigh meat with oyster meat from a white cap, which is an end of a thighbone of a work, which is a thigh portion of an edible beast or fowl, the oyster meat being a small lump of meat connected to the thigh meat with a membrane and to the white cap with a sinew, the apparatus comprising:
a clamper for clamping the work to allow the thighbone to be swung during conveyance thereof; and
a guide-with-a-cutter device, which has a Y-shaped guide, a narrow slot extending along a conveying direction at a base part thereof, downstream relative to the conveying direction from the Y-shaped guide, and a cutter downstream relative to the conveying direction from an opening of the narrow slot,
wherein an open end side of the Y-shaped guide is directed toward upstream of the conveying direction, and
wherein the Y-shaped guide contacts the thighbone and swings the thighbone toward upstream of the conveying direction, the white cap rides on the base part of the guide-with-a-cutter device while the sinew connecting the oyster meat to the white cap is introduced into the narrow slot as the work with the oyster meat and thigh meat hanging from the white cap is under the Y-shaped guide, and the sinew is cut with the cutter to separate the oyster meat attached to the thigh meat from the white cap.

6. An apparatus for separating thigh meat from oyster meat, which is a small lump of meat connected to the thigh meat with a membrane and to a white cap with a sinew, the white cap being an end of a thighbone of a work, which is a thigh portion of an edible beast or fowl, the apparatus comprising:
a guide-with-a-groove device, which has a Y-shaped guide with a narrow throat at a base part thereof, and an open slot following the narrow throat of the Y-shaped guide,
wherein an open end side of the Y-shaped guide is directed toward upstream of a conveying direction of the work, and
wherein the open slot is dimensioned to allow the oyster meat to pass therethrough while preventing the thigh meat from passing therethrough as the work is being conveyed, thus separating the oyster meat from the thigh meat.

7. The apparatus according to claim 5, further including a stopper guide provided on the narrow slot of the guide-with-a-cutter device for preventing the sinew connecting the oyster meat to the white cap from passing through the narrow slot without being cut with the cutter.

* * * * *